(No Model.)
W. H. DENISTON.
CULTIVATOR.
No. 245,456.  Patented Aug. 9, 1881.
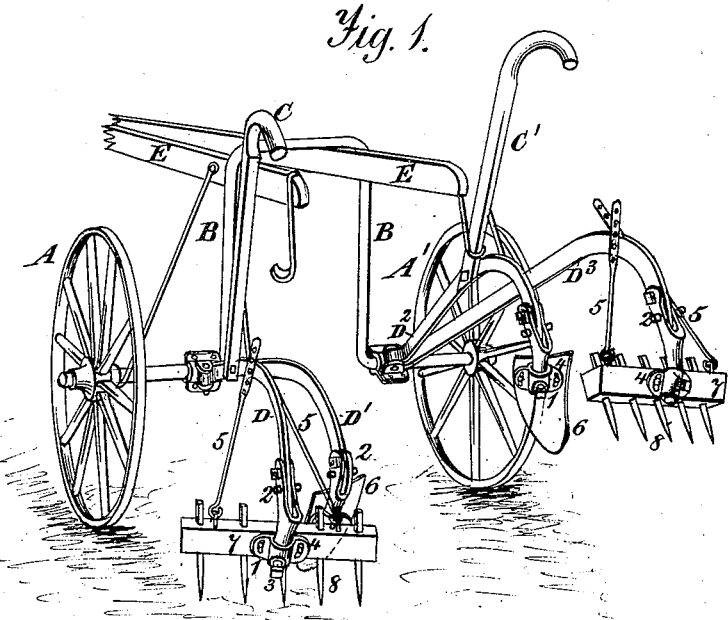
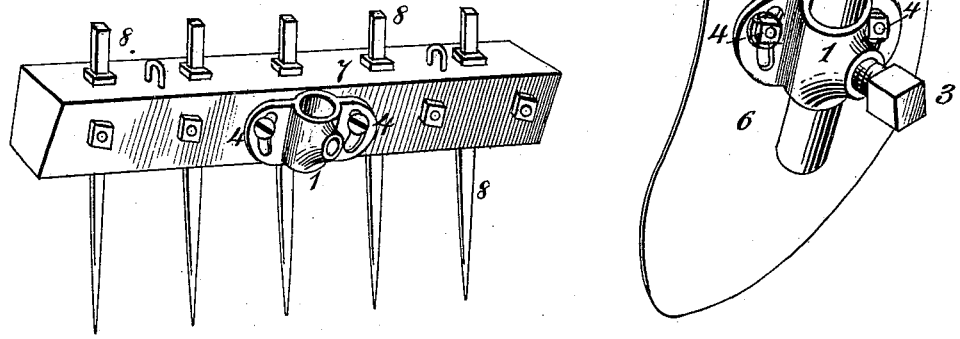
Witnesses.
A. Ruppert.
C. M. Connell
W. H. Deniston
Inventor.
Holloway & Blanchard
Attys

UNITED STATES PATENT OFFICE.

WILLIAM H. DENISTON, OF PERU, INDIANA.

CULTIVATOR.

SPECIFICATION forming part of Letters Patent No. 245,456, dated August 9, 1881.

Application filed April 15, 1881. (No model.)

*To all whom it may concern:*

Be it known that I, WILLIAM H. DENISTON, a citizen of the United States, residing at Peru, in the county of Miami and State of Indiana, have invented certain new and useful Improvements in Cultivators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in implements for cultivating corn and other growing crops; and the objects of my improvements are, first, to provide such a combination of devices as will enable the operator to set the shovels or hoes at the required height upon their arms, and at the required angles with reference to the rows of the crop, as well as the distance at which the parts shall run from the rows; second, to combine with the beams of the implement adjustable shovels or hoes and harrows, in such a manner that their relation to the rows of the crop can be readily adjusted to meet the different conditions under which the implement is to be used; and, third, to combine with the beams and harrows adjustable levers for the purpose of adjusting the angularity of the harrows with reference to the rows of the crop. I attain these objects by means of the devices illustrated in the accompanying drawings, in which—

Figure 1 is a perspective view of a straddle-row cultivator having my improved devices attached thereto, it showing also the combinations herein claimed. Fig. 2 is a perspective view of one of the harrows used, and the socket for attaching it to the beam or to a socket attached thereto; and Fig. 3 is a perspective view of a shovel which it is proposed to use in combination with a harrow and with the other parts of a cultivator, it showing also an adjustable socket for connecting it to the beam of the implement.

Similar letters refer to similar parts throughout the several views.

A A' refer to the carrying-wheels of a straddle-row cultivator, B to an axle which has a central raised portion for allowing it to pass over the crop which is being cultivated, C C' to the handles for raising and lowering the shovels and harrows, D D' and D² D³ to the beams, which are secured to the axle in such a manner that their outer ends may be raised or lowered into the positions shown in Fig. 1, their forward ends turning upon said axle or being attached to a socket which turns thereon, and E E to the hounds to which the tongue of the machine is attached.

The above-referred-to parts do not constitute any part of my present invention, and hence need not be more particularly described here, it being only necessary to say that they may be of any approved form that will admit of their being attached to the parts constituting my present invention, which consists in a socket, 1, for connecting the shovels and harrows to an arm or arms, 2, which are pivoted to the beams, as shown in Fig. 1, one of the bolts or pins which attach them thereto being made of wood, so that in the event of the shovel or harrow striking any solid substance said bolt or pin may break, and thus prevent the breaking of the other parts of the implement. The arms 2 referred to are bifurcated at their upper ends, so as to cause them to receive the flattened end of the beam to which they are attached, while their lower ends are round in order that they may pass through the apertures formed in the sockets 1 on the shovels and harrows. These sockets are provided with set-screws, which enables the operator to set the face of the shovel or harrow at any desired angle to the line of the row of corn or other plants. They are also provided with curved slots in those portions which rest against the shovels or the beams of the harrows, in order that they may be set with their points at a greater or less angle to the plants, they being provided with bolts and with nuts for securing them to the shovels and harrows, and securing the same in their adjusted positions.

Fig. 1 shows one shovel and one harrow attached to beams upon each side of the machine, the object of such an arrangement being to cause the shovel to travel somewhat in advance of the harrow, said shovel being set at such an angle to the row of plants as to cause the earth which it removes to be thrown away from said plants toward the harrow, which is in the rear of it, and is set at such an angle as to return the earth removed by the shovel to about its original position with reference to the row of plants after it has been properly pulverized.

For the purpose of aiding in holding the harrows in their positions, especially when adjusted angularly, braces 5 5 are attached to the ends, or at points near the ends, of the beams of the harrows, they being secured thereto by eyebolts upon which they can turn freely, their forward ends being provided with slots or a series of holes through which bolts pass for the purpose of attaching them to the beams. These braces may be so adjusted upon the beams of the implement as to cause the harrows to be at a right angle to the rows, or at such an angle as to have a tendency to force the earth toward the plants or away from them, as circumstances may require. They also serve to prevent the harrows from twisting on the beam in the event of the breaking of the bolt or pin which assists in holding the harrow or shovel in right position on the beams.

The shovels above referred to are designated by the figure 6, and may be of any desired form, dimensions, and material, they being by preference made of steel, and of substantially the form shown in Fig. 3.

The harrows are composed of a bar, 7, of any suitable material and dimensions, in which are secured any suitable number of teeth, 8 8, which pass down through the beam 7, as shown in the drawings.

Having thus described my invention, what I claim, and desire to secure by Letters Patent, is—

In straddle-row wheel-cultivators, the beams $D'$ and $D^2$, carrying cultivator-shovels 6, in combination with beams D and $D^3$, extending to the rear of said beams $D'$ and $D^2$, and carrying harrows 7, and arranged in relation to said cultivator-shovels, as shown and described.

In testimony whereof I affix my signature in presence of two witnesses.

WILLIAM H. DENISTON.

Witnesses:
WILLIAM C. FARRAR,
F. M. FAY.